UNITED STATES PATENT OFFICE 2,008,966

PROCESS AND COMPOSITION FOR APPLYING AND FIXING DYESTUFF

Donald H. Powers, Moorestown, N. J., and Harold W. Stiegler, Bristol, Pa., assignors to Röhm & Haas Company, Philadelphia, Pa.

No Drawing. Application September 15, 1932, Serial No. 633,268

21 Claims. (Cl. 8—6)

This invention relates to a new and useful process of applying and fixing dyestuffs.

It is the object of this invention to disclose new and useful methods of applying and fixing dyestuffs. It is a further object of this invention to produce faster and brighter colors and to eliminate certain difficult and troublesome steps which have hitherto been necessary. It is a further object to make possible the combination in the same pattern of widely different types of dyestuffs which are now run separately. Another object is to prepare color pastes containing undeveloped color and one of the group of amine salts, amides or imides.

Certain classes of colors and color forming products are stable in strongly alkaline solution. When these solutions are treated with acid the color-forming products change to give stable dyestuffs. For example certain azo amino compounds are stable in alkaline solution and when acidified manage to give diazo compounds which immediately couple with amines or naphtholes to form azo dyestuffs. In a similar fashion the sodium salts of the disulphuric esters of the leuco body of indanthrene or vat colors may be treated with an acid and oxidizing agent so that the ester is split off leaving the insoluble vat color.

Common examples of this type of dyestuff requiring acid for their development are the so-called Rapidogens (registered trade mark) and Indigosols (registered trade mark).

The Rapidogen colors consist of stabilized diazotized bases and are stabilized in a number of ways as outlined in U. S. Patents 1,858,623; 1,867,088; 1,871,850; 1,874,524, 1,882,560-2. The characteristic of these stabilized bases lies in the fact that they will return to the diazo compound under the influence of an acid such as acetic. These stabilized bases may be prepared by converting the diazotized compound into an amino azo derivative of a secondary aliphatic amine containing an acid group.

The ordinary Rapid Fast colors consist of naphtholates and diazo compounds which are stabilized by converting them into the nitrosamines (U. S. Patents 1,193,566; 1,127,027 and 1,608,284). It may be noted that these nitrosamines may be reconverted into diazo compounds suitable for coupling by the action of our amine salts.

Rapidogen colors may be prepared by treating diazotized bases with one of the following products as stabilizing agents:

Sarcosine $$CH_3NHCH_2COOH$$

Diphenyl disulphonic acid

Naphthalene trisulphonic acid

1-amino, 2-carboxylic, 5-benzene sulphonic acid.

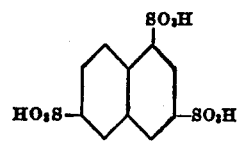

These stabilized diazotized bases may be mixed with the arylides of oxy naphthoic acid, and, on acidification, yield an azo color.

A specific example of a Rapidogen color is suggested. Para nitro-ortho anisidine is diazotized and mixed with sarcosine to give a product of the following probable formula:

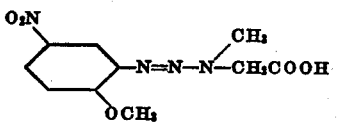

This stabilized diazo compound is mixed with a portion of the anilide of beta oxy naphthoic acid, believed to have the following structure:

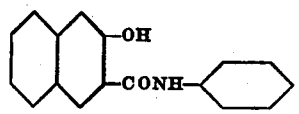

These compounds are soluble in alkaline solution, and, when acidified, the azo amino compound given above is converted into the diazo compound which couples with the anilide to form the azo color.

The Indigosols are the sodium salts of the disulphuric esters of the leuco body of indanthrene, thioindigo or indigo dyestuffs.

These types of dyestuffs appear to be substantially colorless mixtures which are stable in alkaline solution. However, when they are acidified, coupling takes place and they form brightly colored, stable dyestuffs. The azo colors may be produced on the fiber by printing a paste containing an alkaline mixture of the Rapidogen colors, drying and exposing the fabric to acid fumes, or by passing the fabric through an acid solution. However, this after treatment with acid is frequently inconvenient, requiring a separate step and special equipment, and unless conditions are very carefully controlled color value is lost, and the textiles may be damaged. In many cases this difficulty of development eliminates the use of these colors, particularly on sheer or fine fabrics. In all cases the handling of large quantities of acid has proved expensive, troublesome and frequently leads to serious corrosion problems. Certain compounds have long been known which become acid on heating or which neutralize the effect of the alkali present in the dyestuff paste. Examples of such compounds are ammonium sulphocyanide and diethyl tartrate. (See Brit. P. 306,800). More recently acid chlorides, such as naphthalene disulphochloride, have been disclosed (U. S. P. 1,832,208). However, it has been found that these compounds have the marked disadvantage that they act slowly at room temperature. In many cases if a paste is made up containing any of the compounds mentioned and allowed to stand for only a few hours, the developed color begins to separate from the paste in an insoluble, unusable form. This is clearly a serious disadvantage, as these dyestuffs are frequently developed with acid hours and sometimes days after they are printed.

We have found that amine salts and particularly alkyl substituted amine salts may take the place of the acidifying agents mentioned above and may be added directly to pastes containing alkali and dyestuffs of the above types. These pastes may be allowed to stand several days without the development of color. Even when the paste is printed on a fabric and the print dried in the usual manner over dry cans little if any color becomes developed, in contrast to the separation which occurs with ammonium sulphocyanide. However, if this dried print is steamed or warmed in a damp atmosphere for a few minutes, the color develops in the fiber in substantially quantitative yields.

We have found that the amine salts and particularly the salts of alkyl substituted amines of inorganic or organic acids are equally effective. Some of the salts which are of particular interest are:

Mono, di and tri methylamine chlorides, ethylamine sulphate, dimethylamine fluoride, dibutyl amine phosphate, butyl amine gluconate, trimethyl amine oxalate, methyl amine phthalate, ethylene diamine chloride (mono), dimethyl amine tungstate, butyl amine sulphocyanate, ethyl amine naphthalene sulphonate, diamyl amine molybdate, dibutyl amine lactate, methyl amine acetate, dimethyl amine benzoate, amyl amine naphthionate, methyl amine salt of sodium dihydrogen phosphate.

We also found that the amides, imides and substituted amides were effective in developing the colors, although they were much slower in their action than the amine salts. These amides required two to three times as long a steaming to develop the color. Some of the compounds of particular value are:

Acetamide, oxamide, dimethyl oxamide, methyl acetamide, phthalimide.

It is understood, of course, that mixtures of these materials are suitable for use in the process. This process makes possible the simultaneous printing of the so called vat or indanthrene colors along with the so called Rapidogen colors which has not been heretofore practical. This is because the acid fumes used to develop the Rapidogens prevent the penetration and development of the vat colors on the fiber. It is also clear that with the use of amine salts, amides or imides no acids are formed or acid fumes liberated. (See Example 3).

The following examples show some of the applications of these compounds.

(1) A cotton broadcloth was printed with the following print paste, the print dried and steamed for three minutes in a regular vat ager. A full development of color was obtained.

| Compound | Parts |
| --- | --- |
| Rapidogen corinth IR | 2.0 |
| Sodium hydroxide (50%) | 2.0 |
| Starch dextrin thickener | 85.0 |
| Dimethyl amine chloride | 3.0 |
| Glycerine | 8.0 |

Rapidogen corinth IR is the product obtained by mixing paranitro ortho-anisidine diazotized and stabilized with sarcosine and the dry toluidide of beta-oxy naphthoic acid.

(2) A rayon sateen was printed with the following paste, dried and steamed for ten minutes to give full development of the color.

| Compound | Parts |
| --- | --- |
| Rapidogen blue | 2.5 |
| Sodium hydroxide (50%) | 2.0 |
| Urea | 5.0 |
| Starch dextrin thickener | 83.0 |
| Oxamide | 4.5 |
| Glycerine | 3.0 |

Rapidogen blue B is the mixture obtained by mixing the anilide of beta-oxy naphthoic acid with the product obtained by condensing the diazonium chloride of 2,4 dinitroaniline with aniline 2,5 disulphonic acid.

(3) A rayon crepe fabric was printed with the two following pastes, dried and steamed for six minutes. After printing the fabric was treated with dilute sodium dichromate solution, rinsed and washed. Both the vat color and Rapidogen color were developed.

A

| | |
| --- | --- |
| Rapidogen red R | 2.5 |
| Sodium hydroxide (50%) | 2.0 |
| Glycerine | 4.5 |
| Thickener | 87.0 |
| Butylamine oxalate | 4.0 |

B

| | |
| --- | --- |
| Ciba blue 2BD (Color Index No. 1184) | 2.0 |
| Sodium hydroxide (50%) | 8.0 |
| Glycerine | 5.0 |
| Sodium sulfoxylate formaldehyde | 8.0 |
| Thickener | 77.0 |

Rapidogen red R is the product obtained by mixing the para-anisidide of 2 oxy 3 naphthoic acid with 5 nitro 2 methoxy 1 benzene-azo dimethylamine.

(4) A cotton sheeting was printed with the two following pastes, dried, steamed in an open steamer for ten minutes, dried and soaped.

A

| | |
|---|---|
| Rapidogen Corinth IR | 1.0 |
| Sodium hydroxide (50%) | 2.0 |
| Methanol | 2.0 |
| Thickener | 91.0 |
| Mixed mono-di-tri methylamine sulphate | 4.0 |

B

| | |
|---|---|
| Chrome fast yellow RD (Color Index No. 441) | 3.0 |
| Formic acid | 2.0 |
| Acetate of chrome 30° tw | 8.0 |
| Thickener | 87.0 |

(5) An all silk satin was printed with the following paste, dried, wet out with water, and slowly dried over a series of hot dry cans. The color had developed and the fabric was washed and dried in the usual manner.

| | |
|---|---|
| Rapidogen blue B | 1.2 |
| Rapidogen Corinth 1B | 0.3 |
| Sodium hydroxide (50%) | 5.0 |
| Methanol | 6.0 |
| Urea | 7.0 |
| Thickener | 72.5 |
| Dimethyl amine phosphate | 8.0 |

Parts (6) Indigosol 04B (sodium salt of disulphuric ester of leuco-Indigo MLB/4N "Color Index No. 1184") — 6
Glycerine — 5
Sodium chlorate — 2
Dimethylamine thiocyanate — 3
Diethylamine vanadate (1:1000) — 9
Thickener — 75

This print paste is made up in the usual fashion, printed on the fabric, dried and steamed for 3–5 minutes. The fabric is then washed in the usual fashion and dried with the color fixed upon the fiber.

The thickener used in these examples was made up as follows:

| | |
|---|---|
| Wheat starch | 120 |
| Dextrin | 150 |
| Water | 800 |

(7) Cotton dimity was wet out in the following solution, dried and passed through a rapid ager which gave a six minute steaming. After steaming the fabric was soaped. In this way a solid shade was obtained on the fabric. The dye solution was made up as follows:

Per cent

| | |
|---|---|
| Rapidogen Corinth IR | 4.0 |
| Sodium hydroxide (50%) | 1.5 |
| Glycerine | 4.5 |
| Dimethyl amine naphthalene sulphonate | 3.0 |

It is understood that the above examples are merely illustrative and are not to be understood in any way as limiting the invention, the scope of which is to be determined only by the claims which follow hereinafter. Amine salts in general are meant to be covered as well as amides and imides and more particularly alkyl substituted amine salts. No modification of the invention is claimed to the exclusion of other modifications. While the examples cited have mentioned specifically cotton, rayon and silk fabrics, we have found that wool can be treated in a similar fashion as well as synthetic, vegetable and animal fibers in general or their mixtures.

The amides and imides are dehydration products of the amine salts and ammonium salts. While the ammonium salts have been found to be too active, the anhydrides or amides and imides are much slower in their action than even the amine salts.

What we claim is:

1. In the process of coloring textiles in which the color is developed by a reduction in the alkalinity of the paste the step of applying the undeveloped color and subsequently developing by means of one of the group consisting of amine salts, amides of lower aliphatic acids and mixtures.

2. In the process of coloring textiles in which the color is developed by a reduction in the alkalinity of the paste the step of developing colors on the fiber by the reduction of the alkalinity of the dye paste by means of one of the group consisting of amine salts, amides of lower aliphatic acids.

3. In the process of coloring textiles in which the color is developed by a reduction in the alkalinity of the paste the step of developing azo colors by applying the undeveloped color to the textile and subsequently developing by means of one of the group consisting of amine salts, amides of lower aliphatic acids and mixtures.

4. In the process of coloring textiles with azo colors in which the color is developed by a reduction in the alkalinity of the paste the step of applying the undeveloped color and subsequently developing by means of alkyl amine salts.

5. In the process of coloring textiles with azo colors in which the color is developed by a reduction in the alkalinity of the paste the step of applying the undeveloped color and subsequently developing by means of dialkyl amine salts.

6. In the process of coloring textiles with azo colors in which the color is developed by a reduction in the alkalinity of the paste the step of applying the undeveloped color and subsequently developing by means of a dialkyl amine salt of an inorganic acid.

7. In the process of coloring textiles with azo colors in which the color is developed by a reduction in the alkalinity of the paste the step of applying the undeveloped color and subsequently developing by means of a dialkyl amine salt of hydrochloric acid.

8. In the process of coloring textiles with azo colors in which the color is developed by a reduction in the alkalinity of the paste the step of applying the undeveloped color and subsequently developing by means of the dimethyl amine salt of hydrochloric acid.

9. In the process of coloring textiles in which the color is developed by a reduction in the alkalinity of the paste the steps of applying undeveloped color along with vat colors and subsequently developing by means of one of the group consisting of amine salts and amides of lower aliphatic acids.

10. In the process of coloring textiles in which the color is developed by a reduction in the alkalinity of the paste the step of printing undeveloped color pastes and subsequently developing the azo color by means of one of the group consisting of amine salts and amides of lower aliphatic acids.

11. In the process of coloring textiles in which the color is developed by a reduction in the alkalinity of the paste the steps of applying a color paste comprising a naphtholate and stabilized diazotized base and subsequently developing the azo color by means of one of the group consisting of amine salts and amides of lower aliphatic acids.

12. A process as described in claim 11 in which the color is developed by means of a salt of an alkyl amine.

13. A process as described in claim 11 in which the color is developed by means of a salt of a dialkyl amine.

14. A process as described in claim 11 in which the color is developed by means of dialkyl amine salts of an inorganic acid.

15. A composition of matter comprising a mixture of undeveloped color paste of the type which requires a reduction in alkalinity to develop the color and one of the group consisting of amine salts, amides of lower aliphatic acids and mixtures.

16. A composition of matter comprising a mixture of undeveloped azo color paste of the type which requires a reduction in alkalinity to develop the color and one of the group consisting of amine salts, amides of lower aliphatic acids and mixtures.

17. A composition of matter comprising a mixture of naphtholate and diazotized stabilized base and one of the group consisting of amine salts, amides, and mixtures.

18. A composition of matter comprising a mixture of undeveloped color paste of the type which requires a reduction in alkalinity to develop the color and an alkyl amine salt.

19. A composition of matter comprising a mixture of undeveloped color paste of the type which requires a reduction in alkalinity to develop the color and a dialkylamine salt.

20. A composition of matter comprising a mixture of undeveloped color paste of the type which requires a reduction in alkalinity to develop the color and a dialkylamine salt of an inorganic acid.

21. A composition of matter comprising a mixture of undeveloped color paste of the type which requires a reduction in alkalinity to develop the color and the dimethylamine salt of hydrochloric acid.

DONALD H. POWERS.
HAROLD W. STIEGLER.